Nov. 11, 1969 E. H. BRYANT, JR 3,478,168

TELEPHONE ANNOUNCEMENT CONTROL TO SELECT MESSAGE CONTENT FOR NORMAL AND OVERLOAD SUBSCRIBER CONDITIONS

Filed Oct. 1, 1965

INVENTOR
Ellis H. Bryant, Jr.
BY Watson, Cole, Grindle & Watson
ATTORNEYS

United States Patent Office 3,478,168

Patented Nov. 11, 1969

3,478,168

TELEPHONE ANNOUNCEMENT CONTROL TO SELECT MESSAGE CONTENT FOR NORMAL AND OVERLOAD SUBSCRIBER CONDITIONS

Ellis H. Bryant, Jr., Atlanta, Ga., assignor to The Audichron Company, Atlanta, Ga., a corporation of Georgia Filed Oct. 1, 1965, Ser. No. 491,912

Int. Cl. H04n 7/02

U.S. Cl. 179—6 6 Claims

ABSTRACT OF THE DISCLOSURE

Apparatus for controlling the selection and transmission of recorded information from two information groups containing data of the same data intervals to a receiver wherein relays are actuated by cyclic timing signals to select information from one or both of the information groups to reduce or increase the information transmitted in a reproduction cycle in accordance with the monitored operating load of the receiver whereby the number of data transmissions is increased during the periods of receiver overloads by transmitting information from only one of the information groups and the length of the data transmission is increased to accommodate successive data transmission from each of the information groups during non-overload periods.

Figures 1, 2:
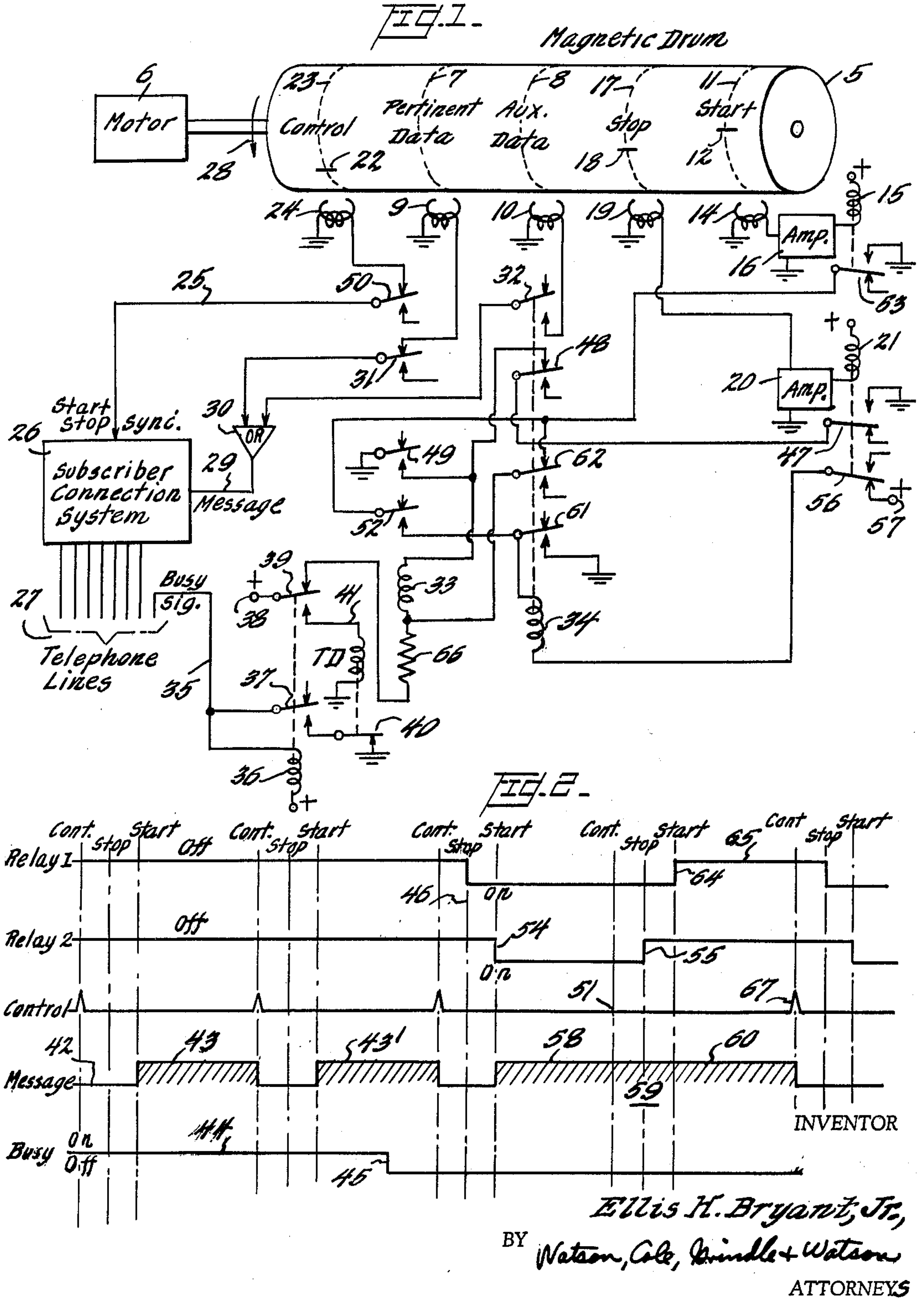

This invention relates to announcement systems for the playback of recorded messages into a plurality of communication channels such as telephone lines, and more particularly, it relates to control circuits in such announcement systems operable to produce more efficient use of the telephone lines during busy demand periods.

Machines for making announcements in a telephone line are well known and are exemplified by U.S. Patent No. 2,285,425, issued to John L. Franklin, on June 9, 1942, for the use of a film recording with corresponding control circuits for connecting recorded messages to a plurality of telephone lines upon demand. This equipment is used, for example, in making announcement such as time and temperature conditions into telephone lines connected thereto when a demand signal is evidenced thereon resulting from a connection through the telephone systems indicating that a subscriber has dialed the required number for demanding a playback of the recorded messages.

In using the foregoing type of announcement equipment in telephone systems, it is difficult to determine the proper number of telephone trunk lines connected into the equipment to handle the daily peak loads demanded by the subscribers without undue service interruption. This results because the conditions of extraordinary peak demand loads such as during an electrical storm are significantly greater than the average daily demand loads. Thus, for example, if ten trunk lines were used as representative of the normal daily demand, during periods of extraordinary peak demand the subscriber traffic load could be in the order of at least twenty. This would result in the subscribers encountering a busy condition when trying to dial into the announcement system. While the simple method of correcting this condition is to supply more telephone lines into the announcement system to take care of peak loads to the extent that the system is not overloaded for long periods of time, this is costly in terms of both the announcing equipment and the telephone circuits, which become more complex and tie up equipment which may be only used for a few hours in the day. Thus, it is desirable to provide a more efficient announcing system which can utilize an existing number of trunk telephone lines more efficiently during periods of peak demand.

It is therefore an object of the invention to provide improved and more efficient announcing systems for use with telephone lines.

Another object of the invention is to provide announcing systems for playing back messages in the telephone lines which operate more efficiently during peak demand periods.

In accordance with the principles of the present invention, data recorded for announcement into the telephone lines is separated into two successive data portions. One of these data portions may comprise a general announcement, which is termed auxiliary data, while the other message may comprise time and temperature readings, which is termed pertinent data. In the normal sequence of events when peak demand loads are not present, the announcement and the pertinent data are played back in sequential order to provide a complete message which might be for example 10 seconds in length. However, provisions are made in accordance with this invention during periods of peak loads for providing play back of only the pertinent data which may, for example, have a time duration of only five seconds, thereby reducing the time that lines are in use by 50 percent and thereby increasing the capacity to handle incoming traffic during heavy demand load periods. The invention provides for automatic control circuits to thus increase the efficiency of the announcement system and telephone trunk lines by automatically reducing the length of the recorded message when heavy demand periods are indicated by receipt of busy signals from the telephone switching equipment. In this manner the efficiency of the announcement system and the telephone system is considerably improved, since the number of connection telephone trunk lines which must be handled by the announcement system is retained at a level much less than that required to handle communications during heavy load periods, yet many more messages may be handled with the same number of trunks during the heavy load periods in accordance with the principles of this invention.

The foregoing and further objects and features of this invention are described in the following specification with reference to the accompanying drawing, wherein:

FIGURE 1 is a schematic diagram of an announcement system and corresponding control circuits constructed in accordance with the principles of this invention; and FIGURE 2 is a time sequence diagram indicating operation of the announcement system provided in accordance with this invention under various conditions of load.

With reference now specifically to the drawing, a magnetic drum 5 is provided for playing back prerecorded announcements. This drum 5 is shown schematically to illustrate operation of the invention and may take various forms such as, for example, that in the announcing machine described in U.S. Patent No. 2,862,065 issued Nov. 25, 1958 to John L. Franklin. In that patent the message drum provides for messages of at least two different time durations, together with means for selecting a shorter and a longer one of the messages. It may be seen that various types of recording and control equipment, such as magnetic tape and electronic switching circuits, may be used in announcement systems constructed in accordance with the principles of the present invention, and that the particular embodiment of the invention portrayed is representative of the principles of the invention.

The magnetic drum 5 is continuously rotated by the motor 6 to reproduce messages from the two data tracks 7 and 8 at the corresponding magnetic reproduction heads 9 and 10. Three further tracks are provided on the drum in order to provide timing signals for the control circuits. Thus the start of the message is indicated on track 11 by the recorded timing pulse 12 which is reproduced in head 14 to operate relay 15 momentarily by way of amplifier 16 once for each message cycle of the recorder to indicate the start of the message recorded on the data track 7 and 8. Similarly a stop track 17 includes an end of message signal 18 which is reproduced through head 19 and amplifier 20 for operating relay 21 momentarily after the end of the recorded message on the track is encountered.

A further control pulse 22 is provided on track 23 at the end of the message and before the stop pulse 18 for reproduction by head 24 and is conveyed by way of lead 25 for use in the subscriber connection system 26 for indicating the time at which messages should be connected to or disconnected from telephone lines 27 in synchronism with the presentation of the messages from the recorder 5. The subscriber connection system 26 may be of the type described in the above referenced U.S. Patent 2,285,425, the details of which are not new in accordance with the principles of the present invention and therefore the system is shown only in block diagram form 26.

It may be seen that the drum 5 rotates in the direction of the arrow 28 so that the sequence of the timing signals produced are control signal 22 first, stop signal 18 second, and start signal 12 finally. As may be seen from the timing chart of FIGURE 2 the times of presentation of these signals in a cyclic manner are indicated by the notation at the top of the chart together with corresponding timing lines indicating the time at which a change of conditions occurs responsive to the respective control pulses as they are encountered.

Messages are read into the subscriber system 26 by way of line 29 in which signals from either the data track 7 or the data track 8 are mixed in the OR circuit 30 as respectively associated with relays 33 and 34. These relays and their contacts are shown in inoperated positions which is represented at the left most portion of the timing sequence of FIGURE 2. It may be seen in this condition that contact 31 of relay 33 connects head 9 continuously into the subscriber connection system so that the pertinent data on track 7 is repeated for each cycle.

This is a condition that will be used when the demand is at peak load as indicated by a busy signal coming from the telephone lines at lead 35. This signal, which may be typically a grounded line, will operate traffic control relay 36 which is retained in operated position by holding contact 37 to disconnect voltage at terminal 38 from relay 33 by way of relay contact 39 and therefore prevent any change in the condition of cyclically repeating only the pertinent data until the traffic control relay 36 is released by opening of contact 40. This contact 40 is opened by the time delay relay 41 which typically has a time delay of 90 seconds after contact 39 returns to the upper position shown. Thus if a busy signal is encountered on lead 35, relay 36 closes its contacts and will be retained in operated position for a period of 90 seconds after the busy signal is removed before being released. If the busy signal at line 35 re-occurs after the time delay relay releases holding contact 40, relay 36 will be reoperated and the time delay will be reinstated. Thus as long as a busy signal appears at line 35, a single cyclic reproduction of only the pertinent data in track 7 on the magnetic recorder will be presented for a reduced or shortened presentation cycle of five seconds, for example.

As may be seen from the timing chart of FIGURE 2, in this condition with the busy signal prevailing during the period 44 both relay 1 and relay 2 are de-energized. Thus the messages indicated in waveform 42 are presented as five second (not to scale) or short duration message blocks 43 successively cycle after cycle until the busy signal on line 35 is released permitting the time delay relay 41 to return power from lead 38 to relay 33 at the time 45 indicated on the timing diagram of FIGURE 2. During this period of time the control pulses 22 are connected directly to the subscriber connection system 26 so that they can provide synchronization pulses ever five seconds for operation in connecting the messages to those ones of telephone lines 27 which are grounded, for example, to indicate a demand for the announcement, and for accordingly disconnecting the lines after a reproduction cycle so that the pertinent data information is presented to subscriber lines at the start of the cycle and is disconnected at the end of the cycle.

When the busy signal is absent and relay 33 is connected to its energizing source at terminal 38, the next successive stop pulse time 46 (FIGURE 2) results in operation of relay 21 momentarily to ground relay armature 47, which in turn through relay contact 48 will serve to energize relay 33, since relay 34 is at this time in an inoperative condition. Relay 33 is then held in operated condition by armature 49 which grounds the top end of the relay coil 33. This serves to disconnect the pertinent data from the subscriber connection system by way of relay contact 31 and further by way of relay contact 50 serves to disconnect the control track 23 from the subscriber connection system as long as relay 33 is operated so that no control pulse is introduced into the subscriber connections system 26 at the time 51 occurring intermediate a longer (10 second) reproduction cycle 59.

The additional contact set 52 on relay 33 serves to connect relay 34 for energization through the armature 53 on the start relay 15 so that the immediately following start pulse at time 54 will serve to also energize relay 34 and hold it energized until the end of the recording period for one cyclic revolution of the magnetic recorder in the manner hereinafter described. At the subsequent stop pulse time 55 relay 21 will open armature 56 and remove the energizing source 57 from relay 34 and cause it to drop out into an inoperative position again. During the period of operation of relay 34, therefore, the auxiliary data on track 8 will be connected through relay armature 32 to the subscriber connection system as is constituted by the earlier portion 58 of the longer message portion 59 which constitutes in essence the auxiliary data in the beginning portion 58 and pertinent data in the trailing portion 60. It is noted that relay 34 is held in operated position during the period of the auxiliary data presentation by armature contact 61 which grounds the upper terminal of the coil 34.

When relay 34 drops out, armature 62 connects the start signal reproduced by armature 53 of relay 15 the next succeeding start pulse time 64 to the bottom of coil 33 thereby causing the relay 33 to again drop out as indicated by waveform section 65. That is, when relay coil 33 has both ends grounded it releases its contacts. Resistor 66 is provided to prevent the grounding of the power terminal 38 when this operation takes place. Thus as relay 33 is de-energized, contact 31 is connected so that the pertinent data on track 7 is reproduced into the subscriber connection 26 in sequence with the auxiliary data 58 as indicated by section 60 of the combined longer reproducing period 59. Since the control signal from track 23 is disconnected from the subscriber connection system, the connection of the longer recorded signal to the telephone lines is made at the start and the end of the long cycle without any modification of the control circuits in the block 26. However, the next succeeding control pulse 67 after the end of the record cycle occurs to indicate the next successive cycle whether it be a long or a short reproduction cycle.

It is evident that the sequence of operations of the control circuits with the magnetic drum provide for presenting two message portions in sequence one after the other during any period that the busy signal is absent, but converting the presentation of the data to a shorter cycle including only the pertinent data on track 7 when the busy signal is produced during any period of heavy demand where the telephone lines are not able to handle the number of calls being made thereon requesting playback of the messages recorded in the announcement system.

It is to be recognized that in accordance with the teachings of this invention existing announcement systems could be converted by adopting the principles of the invention to supply control circuits made obvious to those skilled in this art by the teachings of the present invention so that the equipment could be used more efficiently under periods of heavy demand by reproducing automatically signals of shorter time duration than those presented in periods where the demand is not sufficient to busy the telephone lines connected to the announcement system. Therefore the present invention has provided an improved and more efficient system for reading announcements into a plurality of telephone lines, and those novel features believed descriptive of the nature of the invention are defined with particularity in the following claims.

What is claimed is:

1. Apparatus for controlling the flow of information in a communication system, comprising;

means for reproducing recorded information having a fixed data length, means for receiving and transmitting reproduced information to selected terminating stations, means for generating periodic control signals, said control signals at least including a periodic timing signal representative of the beginning of a reproduction interval having a predetermined duration, means responsive to said control signals for controlling the reproduction of said recorded information and the transmission thereof to said receiving means, said control means including means for monitoring the operating load of said receiving means and for initiating overload signals indicating that the operating load has attained a predetermined level, said control means further including means responsive to said overload signals to select the amount of recorded information transmitted to said receiving means in each cycle, said recorded information being divided into first and second information groups of equal duration, and said selection means transmitting information from both of said first and second information groups to said receiving means in the absence of said overload signals and only information from said first information group in the presence of said overload signals.

2. Apparatus according to claim 1 wherein said selection means includes time delay means for delaying the termination of an overload signal for a fixed duration after the initiation thereof.

3. Apparatus according to claim 1 wherein said periodic timing signal has a period enabling the reproduction of information from said first information group.

4. Apparatus according to claim 1 wherein said control signals also include signals indicating the beginning and end of recorded information in both said first and second information groups and wherein said selection means is conditioned to first select information from said first information group and to terminate the transmission of information to said receiving means in the presence of said overload signal and said periodic timing signal and to select information from said second information group for successive continuous transmission to said receiving means in the absence of said overload signal and in response to said cyclic timing signal, said start and stop signals serving to condition said selection means for the transmission of information to said receiving means.

5. Apparatus according to claim 4 wherein said means for reproducing recorded information includes a magnetic drum driven at a fixed rate and said drum including auxiliary tracks containing information for generating said control signals and said information in said first and second information groups is recorded on separate tracks.

6. Apparatus according to claim 5 wherein said selection means includes an OR gate for accepting and transmitting information from said first and second information groups.

References Cited

UNITED STATES PATENTS

| | | | |
|---|---|---|---|
| 3,190,965 | 6/1965 | Zarouni | 179—18 |
| 3,347,990 | 10/1967 | Doyle et al. | 179—6 |

STANLEY M. URYNOWICZ, Jr., Primary Examiner

RAYMOND F. CARDILLO, Jr., Assistant Examiner